Figure 1:
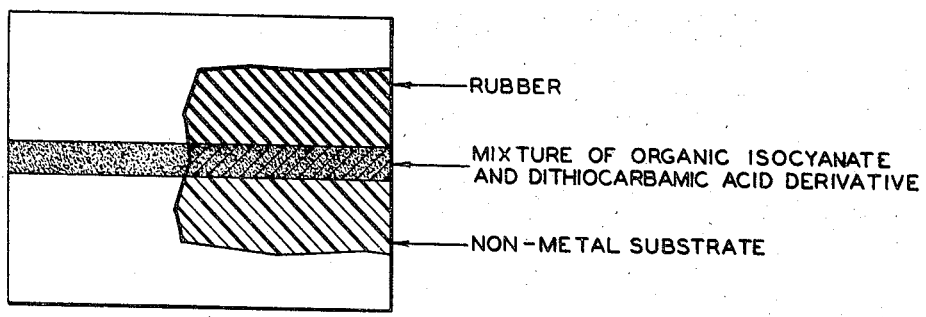

June 3, 1958  E. W. COLEMAN, JR  2,837,458
BONDING RUBBER TO SUBSTRATES
Filed April 29, 1955

INVENTOR:
ELMER W. COLEMAN, JR.
BY
ATTYS.

2,837,458
Patented June 3, 1958

2,837,458
BONDING RUBBER TO SUBSTRATES

Elmer W. Coleman, Jr., Erie, Pa., assignor to Lord Manufacturing Company, Erie, Pa., a corporation of Pennsylvania Application April 29, 1955, Serial No. 505,025

32 Claims. (Cl. 154—139)

The present invention relates to a novel method for bonding olefinic rubber to a solid substrate; and, in a more specific embodiment, the invention relates to a novel method for bonding an olefinic rubber body to a polyurethane rubber or resin body whereby an improved bond is obtained as compared to prior methods for bonding together bodies of these materials. The invention also relates to a novel product comprising olefinic rubber bonded to a solid substrate, preferably a polyurethane resin or rubber, and to a novel adhesive composition therefor.

As is now known, the polyurethane rubbers possess excellent resistance to wear, sunlight, ozone and general weathering. Because of these properties, polyurethane rubber is finding increasing application in the manufacture of articles, such as tires, shoe soles and heels, and the like. In many of these applications, it is the practice to provide only an outer, exposed layer of the polyurethane rubber bonded to a main body of olefinic rubber. For example, in the manufacture of tires, it is presently the practice to prepare the tread of polyurethane rubber and the casing of an olefinic rubber, the polyurethane rubber tread being bonded to the olefinic rubber casing.

The difficulty in obtaining satisfactory bonds between polyurethane rubber and olefinic rubbers is well recognized. The most successful of the prior bonding agents or adhesives suggested to facilitate bonding are compositions comprising isocyanates. Even with these adhesives, however, the bond strength is not as great as is desired in most cases.

The use of isocyanates to bond olefinic rubbers to other solid substrates has also been suggested. In these cases also improved bonds would be desirable.

It is the principal object of the present invention to provide a novel method for bonding olefinic rubber to solid substrates.

It is another object of the present invention to provide a novel method for bonding an olefinic rubber body to a polyurethane rubber or resin body whereby are provided bond strengths such that, under stress, failure will occur in one or the other of the bodies rather than at the bond line.

Another object of the invention is to provide a novel article of manufacture comprising an olefinic rubber body bonded to a solid substrate.

Still another object of the present invention is to provide a novel article of manufacture comprising an olefinic rubber body bonded to a polyurethane resin or rubber body to such a degree that failure will take place in one or the other of the bodies rather than at the bond line.

Other objects, including the provision of a novel adhesive composition, will become apparent from a consideration of the following specification and claims.

The bonding of olefinic rubber to solid substrates in accordance with the present invention, comprises interposing between the substrate and the olefinic rubber body an intermediate bonding phase comprising an isocyanate and a dithiocarbamic acid derivative selected from the group consisting of (a) the thiuram polysulfides having the formula:

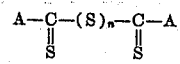

and (b) the selenium dithiocarbamates having the formula:

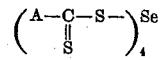

where A is a tertiary amine group, and where n is an integer from 2 to 4, the isocyanate being at least available at the interface between the intermediate phase and the substrate and the dithiocarbamic acid derivative being at least available at the interface between the intermediate phase and the olefinic rubber body, and heating the resulting assembly under pressure.

Figure 2:
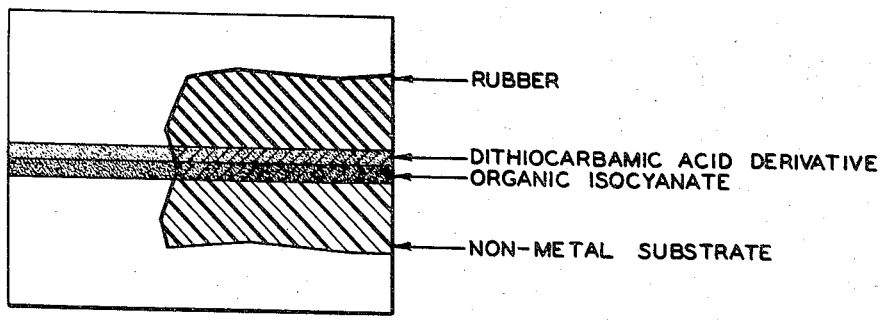

The present invention will be more readily understood from a consideration of the drawing in which:

Figure 1 is an end elevational view, partly in section, of an assembly bonded in accordance with one embodiment of the invention, and Figure 2 is an end elevational view, partly in section, of an assembly bonded in accordance with another embodiment.

It has been found that the bonding of olefinic rubber bodies to solid substrates in accordance with the method of the present invention provides bond strengths which are superior to those provided by prior methods. For example, in the bonding of olefinic rubber bodies to polyurethane bodies in accordance with the present invention, the bond strengths are quite often greater than the cohesive strength of the polyurethane body itself so that the polyurethane body and the olefinic rubber body cannot be separated without tearing into the polyurethane body. This is true even at elevated temperatures.

The present invention is broadly applicable to the bonding of olefinic rubber to any solid substrate. As far as adhesion with the solid substrate is concerned, the isocyanate is the active material, and isocyanates will bond to metals or to solid non-metals having an internal covalent structure and possessing sites which associate with the isocyanate groups. This association may be by virtue of chemical reaction between the isocyanate groups and sites in the substrate reactable chemically therewith, principally hydrogen or other isocyanate groups. Thus, solid materials containing hydrogen, hydroxyl groups, aldehyde groups, carboxyl groups, amine groups, and the like, exemplified by synthetic and natural rubber; synthetic resins, such as polyamide resins (nylon type), polyester resins, phenolaldehyde resins and urea-aldehyde resins; cellulose and cellulose derivatives, such as wood, rayon and cellulose ethers and esters and leather bond by virtue of hydrogen sites. Polyurethane rubbers and resins, which contain isocyanate groups, bond principally through these isocyanate sites. The stated association may also be by virtue of electrical (physical) means, and such materials as glass and ceramics are examples of substrate materials which can be bonded by this mechanism. As stated, the present invention is particularly applicable to the bonding of olefinic rubber to polyurethane rubber or resin, and the present invention will be more fully described hereinafter in terms of employing a polyurethane body as substrate. The substrate body to which the olefinic rubber body is bonded in accordance with the present invention may be in the form of a continuously solid product such as a sheet, block or the like, or may be in the form of fibers, filaments, yarns, cords or the like, or fabrics containing these.

The polyurethane rubbers and resins, as is well known, are isocyanate-extended polyesters. That is to say, they are prepared by reacting an isocyanate compound, usually a diisocyanate, with a relatively high molecular weight polyester formed by reaction between a polyhydric alcohol and a polybasic acid. The particular polyhydric alcohol and polybasic acid selected depends, of course, upon the characteristics desired in the ultimate product. The reaction of the isocyanate with the polyester provides the typical urethane group, OCONHR, from which the product obtains its name. As is normally the case in the bonding of polyurethane rubbers and resins to another body employing heat and pressure, the polyurethane body employed in accordance with the present method will be in the uncured, that is, convertible, state, the heat and pressure employed during bonding being relied upon to cure the polyurethane body.

The present invention, as stated, involves the bonding of an olefinic rubber body. Olefinic rubbers, as is well known, include natural rubbers and the unsaturated, synthetic rubbers such as polybutadiene, rubbery copolymers of butadiene and styrene (Buna S), rubbery copolymers of butadiene and acrylonitrile (Buna N), rubbery copolymers of butadiene and vinyl pyridine, rubbery copolymers of polychloroprene and ethylenically unsaturated compounds, polychloroprene, butyl rubber, and the like.

The intermediate bonding phase for bonding the olefinic rubber body to the substrate in accordance with the present invention will comprise an isocyanate and a defined derivative of dithiocarbamic acid. Referring to the isocyanate, any organic compound containing an isocyanate (NCO) group or groups may be employed since it has been found that the isocyanate grouping is the functional material in the bonding phenomenon, the remainder of the molecule being relatively unimportant. There is a wide variety of isocyanates available which may be employed, ranging from simple organic mono-isocyanate compounds up to polymeric materials containing isocyanate groups. Examples of isocyanate compounds are: the mono-isocyanates, such as the alkyl isocyanates, for instance ethyl isocyanate and octadecyl isocyanate, the aryl isocyanates, for instance phenyl isocyanate and alpha naphthyl isocyanate, and the like; the diisocyanates, such as the polymethylene diisocyanates, for instance ethylene diisocyanate, trimethylene diisocyanate, 2-chlorotrimethylene diisocyanate, tetramethylene diisocyanate, pentamethylene diisocyanate, and hexamethylene diisocyanate, alkylene diisocyanates, for instance propylene-1,2-diisocyanate, butylene-1,2-diisocyanate and butylene-1,3-diisocyanate, alkylidene diisocyanates, for instance ethylidene diisocyanate and heptylidene diisocyanate, cycloalkylene diisocyanates, for instance cyclopentylene-1,3-diisocyanate, cyclohexylene-1,4-diisocyanate and cyclohexylene-1,2-diisocyanate, cycloalkane diisocyanates, for instance cyclohexane-1,4-diisocyanate, aromatic diisocyanates, for instance p-phenylene diisocyanate, 1-methylphenylene-2,4-diisocyanate, naphthylene-1,4-diisocyanate, o,o'-toluene diisocyanate, 5-nitro-1,3-phenylene diisocyanate, xylene-1,3-diisocyanate, 4,4'-diphenylenemethane diisocyanate, 4,4'-diphenylenepropane diisocyanate, benzidine diisocyanate, tolidine diisocyanate, and the like; corresponding tri, tetra, etc., isocyanates, such as 1,2,4-benzene triisocyanate, triphenylmethane triisocyanate, and the like. Examples of polymeric material containing isocyanate groups which may be employed are phosgenated aniline-aldehyde resins, such as those disclosed in Patent 2,683,730. Polyurethane rubber or resin containing the usual isocyanate curatives may also be employed and relied upon to provide a portion of the isocyanate groups at the intermediate bonding phase. The preferred isocyanates comprise molecules containing at least two isocyanate groups, such as the diisocyanates, triisocyanates, polymers containing isocyanate groups, and the like. As stated, isocyanates have been used previously in the bonding of olefinic rubber to solid substrates, and any of the isocyanates normally used may be employed, the particular isocyanate selected forming no part of the present invention.

In accordance with the present invention, there is included in the intermediate phase along with the isocyanate, a dithiocarbamic acid derivative of the type described. The dithiocarbamic acid derivative may be one of the thiuram polysulfides. Such polysulfides will have the formula:

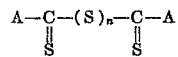

where A is a tertiary amine group. The tertiary amine group may be a dialkyl amine group ($R_2N-$) where R is, for example, an alkyl group containing from one to four carbon atoms, such as methyl, ethyl, propyl and butyl. The tertiary amine group may also be cyclic, such as an N-pentamethylene group:

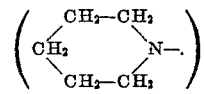

In the foregoing formula, $n$ may be 2, 3, or 4. Examples of such thiuram polysulfides are tetraethyl thiuram disulfide, tetrapropyl thiuram disulfide, tetrabutyl thiuram disulfide, di-N-pentamethylene thiuram tetrasulfide, and the like. The dithiocarbamic acid derivative may also be a selenium salt of a dithiocarbamic acid:

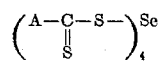

where A is a tertiary amine group as discussed above. The best known of the selenium dithiocarbamates are the selenium dialkyl dithiocarbamates, especially selenium diethyl dithiocarbamate, and this compound is preferred of this group. Of the dithiocarbamic acid derivatives described above, the tetraethyl thiuram sulfides, especially the disulfide, are preferred.

In carrying out the method of the present invention, an intermediate phase comprising the isocyanate and the dithiocarbamic acid derivative is interposed between the surface of the olefinic rubber body and the surface of the substrate which it is desired to bond together. In the intermediate bonding phase, the isocyanate will at least be available at the interface between the substrate body and the intermediate phase, and the dithiocarbamic acid derivative will at least be available at the interface between the olefinic rubber body and the intermediate phase. Such an intermediate phase may conveniently be provided by the application of a mixture, as illustrated in Figure 1, comprising the isocyanate and the dithiocarbamic acid derivative to the substrate and/or the olefinic rubber body, preferably the former. The intermediate phase may also be provided by applying the compounds separately as illustrated in Figure 2. In this connection any one of several procedures may be followed, including applying the dithiocarbamic acid derivative to the olefinic rubber surface and the isocyanate to the substrate surface; applying the isocyanate to the substrate surface after which the dithiocarbamic acid derivative is applied thereover, or the dithiocarbamic acid derivative may be applied to the olefinic rubber surface following which the isocyanate may be applied thereover. As will be discussed more in detail hereinafter, in accordance with preferred practice of the present invention, the intermediate phase will also comprise a film-forming material. In this case, the intermediate phase may be in the form of a preformed sheet comprising the isocyanate, dithiocarbamic acid derivative and film-forming material. This pre-formed sheet may then merely be interposed between the olefinic rubber body and the substrate. The exact procedure followed is not critical, although preferably the isocyanate and dithiocarbamic acid derivative, and film-forming material when used, are applied as an intimate admixture.

As stated, in accordance with the preferred embodiment of the present invention, the intermediate bonding phase will comprise a film-forming material. This material serves as a body for carrying the isocyanate or dithiocarbamic acid derivative, or, preferably both. Any organic film-forming material may be employed for this purpose, although preferably a film-forming material possessing high cohesive strength is selected. Likewise, the particular film-forming material selected may also depend upon the nature of the bonded structure and its application. For example, if the structure is to be of a flexible nature, a flexible film-forming material may be employed. The organic film-forming material may be selected from a wide range of organic materials including synthetic resins, natural and synthetic elastomers, cellulose derivatives, and the like. Examples of synthetic resins and elastomers that my be employed as the film-forming material are the polymers and copolymers of ethylenically unsaturated materials such as vinyl polymers and copolymers, and after-halogenated derivatives thereof, copolymers of vinyl compounds and conjugated dienes and after-halogenated products thereof, polymers of conjugated dienes and after-halogenated derivatives thereof, and the like; condensation polymers, such as phenol-aldehyde resins, aniline-aldehyde resins, epoxy resins, and the like. Especially suitable film-forming materials for use in the present invention are polychloroprene (poly-2-chlorobutadiene-1,3), poly 2,3-dichlorobutadiene-1,3 and after-brominated poly 2,3-dichlorobutadiene-1,3, such as those having a bromine content of between about 7.5 and about 42 mol percent, preferably between about 15 and about 36 mol percent. The isocyanate may be an integral part of the film-forming material, that is to say it may be a film-forming, polymeric material containing isocyanate groups. For example, phosgenated aniline-aldehyde resin, which may serve as the isocyanate-supplying material as pointed out above, may also serve as film-forming material. Likewise, polyurethane rubber or resin, that is, an isocyanate-extended polyester, itself serves as a particularly advantageous film-forming material, and in this case isocyanate groups present therein may be taken into account in making up the bonding phase.

The intermediate bonding phase may contain other materials which are included for any purpose desired. For example, particular ingredients may be included to increase the cohesive strength of the intermediate phase itself, such as usual compounding ingredients selected on the basis of a particular film-forming material. Likewise, catalysts, such as tertiary amines free of reactive hydrogen, which may accelerate the rate of reaction of the isocyanate may also be included with the isocyanate.

Referring to the relative proportions of the main components of the intermediate bonding phase, these may vary widely. As far as the isocyanate is concerned, the isocyanate group itself is the functional portion of that material. It has been found that this group should make up at least about 1%, by weight, of the solids in the intermediate bonding phase at least adjacent the substrate surface. The amount of isocyanate employed may be such that the isocyanate groups make up as much as 50–60%, by weight, of the solids in the intermediate bonding phase at least in the portion adjacent the substrate depending, of course, upon the particular isocyanate selected. Preferably, the amount of isocyanate employed is such as to provide between about 2 and about 25%, by weight, of isocyanate groups on the stated basis. For especially good bonds at elevated temperatures at least about 5% isocyanate groups on the stated basis is recommened. As far as the dithiocarbamic acid derivative is concerned, the important factor is the amount of such compound at least available at the interface between the olefin rubber and the intermediate bonding phase. In this connection, it has been found that the amount of dithiocarbamic acid derivative employed should be such that it makes up at least about 2%, by weight, of the solids in the intermediate bonding phase, at least adjacent to the olefinic rubber surface. Where a separate layer of dithiocarbamic acid derivative is applied directly to the olefin rubber body, all the solids at the interface between the intermediate bonding phase and the olefinic rubber body will be the stated compound. In the case of mixtures comprising the isocyanate and dithiocarbamic acid derivative, the latter make up as much as about 35%, by weight, of the solids thereof.

Reference has been made hereinabove to the application of the principal components of the adhesive bonding phase to one or the other or both of the surfaces to be joined. The particular state in which the components exist at the time of application is not critical insofar as the broader aspects of the invention are concerned, and one or more of the components may be applied in solid, finely-divided form, in the form of a preformed sheet or in liquid form, most advantageously the latter. When applied in liquid form, one or more of the components, which may be a liquid, may serve as the vehicle, or an extraneous liquid vehicle, such as a solvent for one or more of the components, may be employed. Preferably at least one of the components is in solution at the time of application. In this connections, when a film-forming material is employed, it is preferably in solution during application, whereas the isocyanate or dithiocarbamic acid derivative may merely be suspended in such solution. Such situation is included herein and in the claims were reference is made to the application of the composition as a solution. As solvent, there may be employed any organic liquid or mixtures thereof in which the ingredients to be applied are soluble to the extent dictated by the viscosity of the solution and the exact means of application to be employed. Any solvent employed should also be readily volatile so that lengthy drying periods are not encountered. The preferred solvents are aromatic hydrocarbons, such as benzene, toluene, xylene, and the like, the chlorinated aromatic hydrocarbons, such as monochlorobenzene, dichlorobenzene, and the like, ketones, such as methyl ethyl ketone. Alcohols are generally not employed inasmuch as the hydroxyl groups thereof are reactive with the isocyanate.

When a film-forming material is employed as part of the intermediate bonding phase, it may be applied in admixture with the isocyanate or dithiocarbamic acid derivative, or as is preferred, the three components may be mixed. In applying the materials in admixture, that is the mixed isocyanate and dithiocarbamic acid derivative, as well as any film-forming material employed, it is preferred to apply such a mixture to the substrate surface.

After the adhesive components have been applied as described above and any solvent evaporated, the substrate surface and the olefinic rubber surface which are to be bonded are brought together, with the described intermediate bonding phase therebetween, and the assembly heated under pressure to cause vulcanization of the olefinic rubber, and of the substrate when of a vulcanizable nature, and bonding. As is well known in the art, the exact time and temperature of curing will vary depending upon the nature of the bodies bonded as well as on the nature of the particular ingredients in the adhesive phase. In general, however, the temperature during curing will be between about 250 and about 350° F., and the curing time will range from about 20 to about 100 minutes.

The present invention will be more readily understood from a consideration of the following specific examples which are given for the purpose of illustration only and are not intended to limit the scope of the invention in any way.

*Example I*

A freshly mixed adhesive, consisting of 100 parts conventional gum polyurethane elastomer, 50 parts polyisocyanate produced by phosgenation of aniline-formaldehyde resin, 50 parts tetraethylthiuram disulfide and 567 parts methyl ethyl ketone, is applied to the surface of a freshly milled polyurethane rubber compound containing conventional polyisocyanate curatives and allowed to dry. An adhesive consisting of a binary mixture of gum polyurethane elastomer and polyisocyanate is processed along with the ternary adhesive. A freshly sheeted slab of unvulcanized natural rubber compound consisting of 100 parts smoked sheet, 50 parts HAF black (furnace black), 15 parts zinc oxide, 1 part stearic acid, 2 parts sulfur, 1.5 parts benzothiazyl disulfide, and 0.2 part zinc dimethyl dithiocarbamate, is applied to the adhesive coated polyurethane rubber surface. The assembly is vulcanized under pressure for 60 minutes at 274° F. and removed from the mold. The assembly is given an additional oven cure of 24 hours at 158° F. The assembly produced with the binary mixture can be separated readily, the failure occurring between the cement and natural rubber elastomer. The assembly produced with the ternary mixture shows a strong bond at room temperature and at 200° F.

*Example II*

A freshly mixed adhesive consisting of 100 parts neoprene type WRT (butadiene-styrene copolymer), 50 parts polyisocyanate produced by phosgenation of aniline-formaldehyde resin, 10 parts tetraethylthiuram disulfide and 567 parts methyl ethyl ketone, is applied to the surface of a freshly milled polyurethane rubber compound containing conventional polyisocyanate curatives and allowed to dry. A freshly sheeted slab of unvulcanized natural rubber compound consisting of 100 parts smoked sheet, 50 parts furnace black, 15 parts zinc oxide, 1 part stearic acid, 2 parts sulfur, 1.5 parts benzothiazyl disulfide, and .2 part zinc dimethyl dithiocarbamate is applied to the coated polyurethane rubber surface. The assembly is cured under pressure for 60 minutes at 274° F. and removed from the mold. The assembly is given an additional oven cure of 24 hours at 158° F. Examination of the assembly shows that a strong bond has been formed.

Considerable modification is possible in the selection of the components of the intermediate bonding phase as well as in the exact techniques employed without departing from the scope of the invention.

I claim:

1. The method of bonding a body of rubber selected from the group consisting of natural rubbers and unsaturated synthetic rubbers containing carbon-to-carbon double bonds to a solid structural substrate capable of existing as a solid at 250° F. which comprises interposing between said rubber and said substrate an intermediate bonding phase comprising an organic isocyanate and a dithiocarbamic acid derivative selected from the group consisting of (a) the thiuram sulfides having the formula:

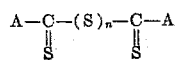

and (b) the selenium dithiocarbamates having the formula:

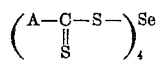

where A is a tertiary amine group and where $n$ is an integer from 2 to 4 the isocyanate being at least available at the interface between the intermediate bonding phase and said substrate and the dithiocarbamic acid derivative being at least available at the interface between the intermediate bonding phase and said rubber body, and heating the resulting assembly under pressure.

2. The method of claim 1 wherein the isocyanate and dithiocarbamic acid derivative are in admixture.

3. The method of claim 1 wherein the isocyanate and dithiocarbamic acid derivative are in separate layers, the layer comprising the isocyanate being in contact with the substrate and the layer comprising the dithiocarbamic acid derivative being in contact with said rubber body.

4. The method of claim 1 wherein a solution comprising the isocyanate and dithiocarbamic acid derivative is applied to the substrate.

5. The method of bonding polyurethane resin and rubber bodies to bodies of rubber selected from the group consisting of natural rubbers and unsaturated synthetic rubbers containing carbon-to-carbon double bonds which comprises interposing between the polyurethane body and said rubber body an intermediate bonding phase comprising an organic polyisocyanate and a dithiocarbamic acid derivative selected from the group consisting of (a) the thiuram sulfides having the formula:

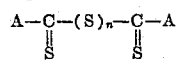

and (b) the selenium dithiocarbamates having the formula:

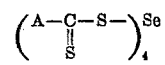

where A is a tertiary amine group and where $n$ is an integer from 2 to 4, the polyisocyanate being at least available at the interface between the intermediate bonding phase and said polyurethane body and the dithiocarbamic acid derivative being at least available at the interface between the intermediate bonding phase and said rubber body, and heating the resulting assembly under pressure.

6. The method of bonding a body or rubber selected from the group consisting of natural rubbers and unsaturated synthetic rubbers containing carbon-to-carbon double bonds to a solid, structural substrate capable of existing as a solid at a temperature of 250° F. which comprises interposing between said substrate and said rubber body an intermediate bonding phase comprising an organic isocyanate, a dithiocarbamic acid derivative selected from the group consisting of (a) the thiuram sulfides having the formula:

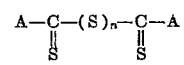

and (b) the selenium dithiocarbamates having the formula:

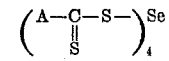

where A is a tertiary amine group and where $n$ is an integer from 2 to 4, and an organic polymeric film-forming material selected from the group consisting of synthetic resins and natural and synthetic elastomers, the isocyanate being at least available at the interface between the intermediate bonding phase and said substrate and the dithiocarbamic acid derivative being at least available at the interface between the intermediate bonding phase and said rubber body, and at least one of said isocyanate and said dithiocarbamic acid derivative being incorporated in said film-forming material and heating the resulting assembly under pressure.

7. The method of claim 6 wherein said isocyanate, dithiocarbamic acid derivative and film-forming material are in admixture.

8. The method of claim 6 wherein a solution comprising the isocyanate, dithiocarbamic acid derivative and film-forming material is applied to said substrate.

9. The method of claim 6 wherein said isocyanate is an integral part of said film-forming material.

10. The method of claim 9 wherein a phosgenated anilinealdehyde resin comprises the isocyanate and film-forming material.

11. The method of claim 6 wherein said film-forming material comprises poly-2,3-dichlorobutadiene-1,3.

12. The method of claim 6 wherein said film-forming material comprises brominated poly -2,3-dichlorobutadiene-1,3.

13. The method of claim 6 wherein said film-forming material comprises polychloroprene.

14. The method of claim 6 wherein said film-forming material comprises an organic isocyanate-extended polyester.

15. The method of claim 6 wherein said dithiocarbamic acid derivative is tetraethylthiuram disulfide.

16. A composite article comprising a body of rubber selected from the group consisting of natural rubbers and unsaturated synthetic rubbers containing carbon-to-carbon double bonds bonded to a solid structural substrate capable of existing as a solid at a temperature of 250° F. by means of an intermediate bonding phase comprising an organic isocyanate and a dithocarbamic acid derivative selected from the group consisting of (a) the thiuram sulfides having the formula:

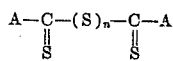

and (b) the selenium dithiocarbamates having the formula:

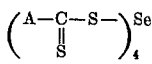

where A is a tertiary amine group and where n is an integer from 2 to 4, the isocyanate being at least available at the interface between the intermediate phase and said substrate and the dithiocarbamic acid derivative being at least available at the interface between the intermediate phase and said rubber body.

17. A composite article comprising a polyurethane resin or rubber body bonded to a body of rubber selected from the group consisting of natural rubbers and unsaturated synthetic rubbers containing carbon-to-carbon double bonds by means of an intermediate bonding phase comprising an organic polyisocyanate and a dithiocarbamic acid derivative selected from the group consisting of (a) the thiuram sulfides having the formula:

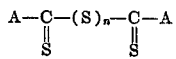

and (b) the selenium dithiocarbamates having the formula:

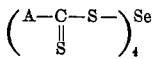

where A is a tertiary amine group and where n is an integer from 2 to 4, the polyisocyanate being at least available at the interface between the intermediate bonding phase and the polyurethane body and the dithiocarbamic acid derivative being at least available at the interface between the intermediate bonding phase and said rubber body.

18. A composite article comprising a solid, structural substrate capable of existing as a solid at a temperature of 250° F. bonded to a body of rubber selected from the group consisting of natural rubbers and unsaturated synthetic rubbers containing carbon-to-carbon double bonds by means of an intermediate phase comprising an organic isocyanate, a dithiocarbamic acid derivative selected from the group consisting of (a) the thiuram sulfides having the formula:

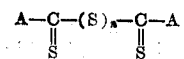

and (b) the selenium dithiocarbamates having the formula:

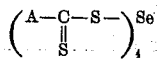

where A is a tertiary amine group and where n is an integer from 2 to 4, and an organic polymeric film-forming material selected from the group consisting of synthetic resins and natural and synthetic elastomers, the isocyanate being at least available at the interface between the intermediate bonding phase and said substrate and the dithiocarbamic acid derivative being at least available at the interface between the intermediate phase and said rubber body, and at least one of said isocyanate and said dithiocarbamic acid derivative being incorporated in said film-forming material.

19. The product of claim 18 wherein said polyisocyanate, dithiocarbamic acid derivative and film-forming material are in admixture.

20. The product of claim 19 wherein a phosgenated anilinealdehyde resin comprises the polyisocyanate and film-forming material.

21. The product of claim 19 wherein said film-forming material comprises poly-2,3-dichlorobutadiene-1,3.

22. The product of claim 19 wherein said film-forming material comprises brominated poly-2,3-dichlorobutadiene-1,3.

23. The product of claim 19 wherein said film-forming material comprises polychloroprene.

24. The product of claim 19 wherein said film-forming material comprises an organic isocyanate-extended polyester.

25. As an adhesive composition a solution comprising, in admixture, an organic isocyanate and a dithiocarbamic acid derivative selected from the group consisting of (a) the thiuram sulfides having the formula:

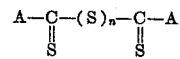

and (b) the selenium dithiocarbamates having the formula:

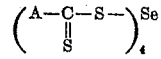

where A is a tertiary amine group and where n is an integer from 2 to 4.

26. As an adhesive composition a solution comprising, in admixture, an organic polyisocyanate, a dithiocarbamic acid derivateiv selected from the group consisting of (a) the thiuram sulfides having the formula:

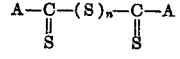

and (b) the selenium dithiocarbamates having the formula:

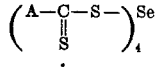

where A is a tertiary amine group and where n is an integer from 2 to 4, and an organic polymeric film-forming material selected from the group consisting of synthetic resins and natural and synthetic elastomers.

27. The product of claim 26 wherein a phosgenated anilinealdehyde resin comprises the polyisocyanate and film-forming material.

28. The product of claim 26 wherein said film-forming material comprises poly-2,3-dichlorobutadiene-1,3.

29. The product of claim 26 wherein said film-forming material comprilses brominated poly-2,3-dichlorobutadiene-1,3.

30. The product of claim 26 wherein said film-forming material comprises polychloroprene.

31. The product of claim 26 wherein said film-forming material comprises an organic isocyanate-extended polyester.

32. The product of claim 26 wherein said dithiocarbamic acid derivative is tetraethylthiuram disulfide.

References Cited in the file of this patent

UNITED STATES PATENTS

| | | |
|---|---|---|
| 2,400,474 | Ten Broeck | May 14, 1946 |
| 2,415,839 | Neal et al. | Feb. 18, 1947 |
| 2,429,080 | Sterret | Oct. 14, 1947 |
| 2,430,479 | Pratt et al. | Nov. 11, 1947 |
| 2,650,212 | Windemuth | Aug. 25, 1953 |
| 2,713,884 | Schwartz | July 26, 1955 |

FOREIGN PATENTS

| | | |
|---|---|---|
| 515,675 | Great Britain | Mar. 5, 1937 |
| 118,839 | Australia | Aug. 17, 1944 |
| 456,911 | Canada | May 24, 1949 |